US012659097B2

(12) United States Patent
Li et al.

(10) Patent No.: US 12,659,097 B2
(45) Date of Patent: Jun. 16, 2026

(54) DATA TRANSMISSION METHOD AND APPARATUS, FIRST COMMUNICATION NODE, AND SECOND COMMUNICATION NODE

(71) Applicant: ZTE Corporation, Shenzhen (CN)

(72) Inventors: Zhigang Li, Shenzhen (CN); Weimin Li, Shenzhen (CN); Zhifeng Yuan, Shenzhen (CN); Yihua Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 395 days.

(21) Appl. No.: 17/793,455

(22) PCT Filed: Jan. 11, 2021

(86) PCT No.: PCT/CN2021/071022
§ 371 (c)(1),
(2) Date: Jul. 18, 2022

(87) PCT Pub. No.: WO2021/143632
PCT Pub. Date: Jul. 22, 2021

(65) Prior Publication Data
US 2023/0068304 A1      Mar. 2, 2023

(30) Foreign Application Priority Data
Jan. 16, 2020    (CN) .......................... 202010049570.5

(51) Int. Cl.
*H04L 5/00*          (2006.01)
*H04L 1/00*          (2006.01)
(52) U.S. Cl.
CPC .......... *H04L 5/0048* (2013.01); *H04L 1/0083* (2013.01)

5

(58) Field of Classification Search
CPC ... H04L 5/0048; H04L 1/0083; H04L 5/0005; H04L 5/0053; H04L 5/10; H04L 5/0094;
(Continued)

(56) References Cited

U.S. PATENT DOCUMENTS 11,272,533 B2 *    3/2022    Cao ..................... H04W 74/002
2007/0217531 A1    9/2007    Kwon et al.
(Continued)

FOREIGN PATENT DOCUMENTS

AU        2011204706 B2 *  4/2014  ........... H04L 1/0009
CN        105515743           4/2016
(Continued)

OTHER PUBLICATIONS

International Searching Authority for corresponding application PCT/CN2021/071022; Mail date Apr. 22, 2021.
(Continued)

*Primary Examiner* — Ayaz R Sheikh
*Assistant Examiner* — Louis Samara
(74) *Attorney, Agent, or Firm* — CANTOR COLBURN LLP

(57) ABSTRACT

A data transmission method and apparatus, a first communication node, and a second communication node are provided. The method includes: acquiring data, wherein the data includes information of N pilots; and sending the data and the N pilots; wherein N is an integer greater than or equal to 1. The solution can avoid the problems of misjudging detection result and interference cancellation error of the receiver caused by the channel correlation between the users, and improve the detection performance of other users, such that the performance of grant-free transmission can be improved.

15 Claims, 5 Drawing Sheets

Index of    Index of
pilot 2     pilot 1

| | | | User identification information |

Service data

(58) Field of Classification Search

CPC .......... H04L 41/0631; H04W 72/1268; H04W 72/23

See application file for complete search history.

(56) References Cited

U.S. PATENT DOCUMENTS

| 2008/0043879 | A1 | | 2/2008 | Gorokhov et al. | |
|---|---|---|---|---|---|
| 2015/0270989 | A1 | * | 9/2015 | Veyseh | H04L 27/265 |
| | | | | | 375/260 |
| 2016/0330059 | A1 | * | 11/2016 | Eitan | H04L 27/2647 |
| 2017/0041050 | A1 | | 2/2017 | Choi | |
| 2018/0026699 | A1 | | 1/2018 | Zhang et al. | |
| 2018/0160443 | A1 | * | 6/2018 | Tang | H04L 27/2613 |
| 2019/0103942 | A1 | * | 4/2019 | Wu | H04L 27/2607 |
| 2019/0260545 | A1 | * | 8/2019 | Wang | H04W 72/23 |
| 2019/0334751 | A1 | * | 10/2019 | Liu | H04L 5/0094 |
| 2020/0267746 | A1 | * | 8/2020 | Xu | H04W 72/30 |
| 2020/0404688 | A1 | * | 12/2020 | Park | H04W 72/1268 |
| 2022/0123888 | A1 | * | 4/2022 | Yuan | H04L 5/0053 |
| 2022/0256463 | A1 | * | 8/2022 | Mu | H04W 52/0219 |

FOREIGN PATENT DOCUMENTS

| CN | 105873120 | A | | 8/2016 | | |
|---|---|---|---|---|---|---|
| CN | 105991267 | A | * | 10/2016 | | H04L 5/00 |
| CN | 108024375 | A | * | 5/2018 | | H04W 72/20 |
| CN | 108111269 | A | | 6/2018 | | |
| CN | 108541074 | A | * | 9/2018 | | H04W 74/004 |
| CN | 110535602 | A | * | 12/2019 | | H04W 74/0833 |
| CN | 110650028 | A | * | 1/2020 | | H04L 41/0686 |
| CN | 107615845 | B | * | 4/2020 | | H04L 5/0053 |
| CN | 111901081 | A | | 11/2020 | | |
| EP | 2523517 | A1 | * | 11/2012 | | H04L 5/0053 |
| EP | 3419340 | A1 | | 12/2018 | | |
| EP | 3595394 | A1 | | 1/2020 | | |
| JP | 2019536353 | A | * | 12/2019 | | H04W 72/23 |
| WO | WO-2018053870 | A1 | * | 3/2018 | | H04B 1/525 |
| WO | 2019195585 | A1 | | 10/2019 | | |
| WO | WO-2019201350 | A1 | * | 10/2019 | | H04W 72/0446 |
| WO | WO-2020113393 | A1 | * | 6/2020 | | H04B 7/0691 |

OTHER PUBLICATIONS

Written Opinion of the International Searching Authority for corresponding application PCT/CN2021/071022; Mail date Apr. 22, 2021.

European Search Report for corresponding application EP21741636; Report dated Jun. 16, 2023.

Ericsson, Power control inaccuracy modeling for NoMA 3GPP TSG RAN WG1 #95 R1-1813259 , 3GPP , Nov. 3, 2018.

Intel Corporation Proposed Way Forward on NOMA , 3GPP TSG RAN #82 RP182752 , 3GPP , Dec. 11, 2018.

Intel Corporation, On remaining details of channel structure for 2-step RACH , 3GPP TSG RAN WG1 #99 R1-1912191 , 3GPP , Nov. 9, 2019.

ZTE, Sanechips , Motivation of Work Item for NR NOMA , 3GPP TSG RAN #8 2 RP-182469 , 3GPP , Dec. 3, 2018.

Chinese Office Action for corresponding application 202010049570. 5; Report dated Feb. 28, 2025, 19 pages.

Chinese Office Action for corresponding application 202010049570. 5; Report dated May 30, 2025, 30 pages.

Japanese Office Action for corresponding application 2022543015; Report dated Mar. 13, 2025, 10 pages.

Qualcomm Incorporated, "Increasing footprint of low power nodes for improved performance," 3GPP TSG RAN WG1 #92 R1 -103563 , 3GPP,Jan. 17, 2018, 02; 9 pages.

ZTE, "Multi-user advanced receivers for Noma," 3GPP TSG RAN WG1 #94 R1-1808152,3GPP,Jan. 11, 2018; 29 pages.

Zte, "Multi-user receivers for Noma," 3GPP TSG RAN WG1 #93 R1-1805841,3GPP,Jan. 12, 2018; 22 pages.

ZTE, "Sanechips, Typical multi-user receivers for Noma," 3GPP TSG RAN WG1 #92 R1-1801416,3GPP,Jan. 17, 2018, 02; 16 pages.

Zte, "Sanechips, Typical multi-user receivers for Noma," 3GPP TSG RAN WG1 #92b R1-1803616,3GPP,2018 Date: Apr. 7, 22 pages.

Korean Office Action; Application No. 10-2022-7027078; Filing Date:Aug. 4, 2022; date of mailing:Nov. 25, 2025; 13 pages.

LG Electronics, "Discussion on Channel Structure for 2-step Rach," 3GPP TSG RAN WG1 #98bis, R1-1910574, 3GPP server publication date (Oct. 5, 2019): 10 pages.

* cited by examiner

5
Fig. 1
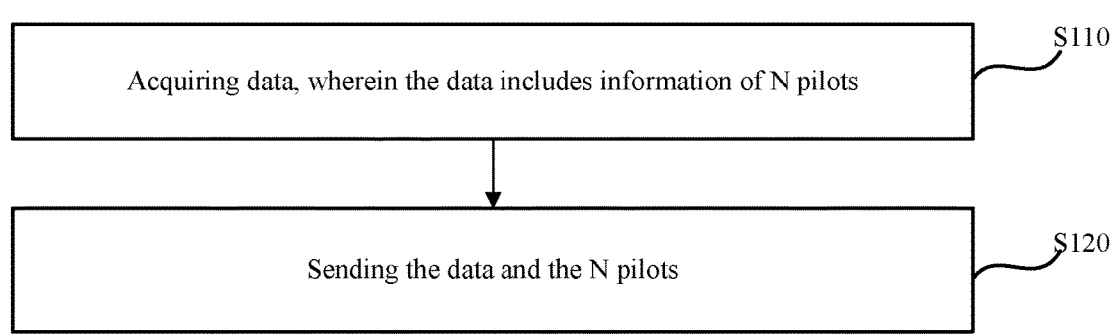
Acquiring data, wherein the data includes information of N pilots    S110
Sending the data and the N pilots    S120
Fig. 1a
| Pilot | Data (including service data and information of the pilot) |
|---|---|
10
Fig. 1b
| Service data | Pilot index |
|---|---|
15
Fig. 1c
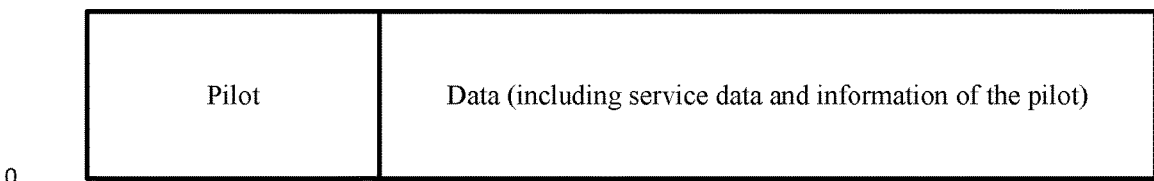
| Pilot | Data (including service data and user identification information) |
|---|---|

5

| Pilot | Data (including service data, information of the pilot and user identification information) |
|---|---|

| Service data | Pilot index | User identification information |
|---|---|---|

10

Pilot index

User identification information

Service data

15

| Service data | Index of pilot 1 | Index of pilot 2 | User identification information |
|---|---|---|---|

5

10

| Service data | Pilot index | Number of pilots | User identification information |
|---|---|---|---|
| | | | |

15

| Service data | Index of pilot 1 | Index of pilot 2 | Number of pilots | User identification information |
|---|---|---|---|---|
| | | | | |

5

10

15

5

10

1

DATA TRANSMISSION METHOD AND APPARATUS, FIRST COMMUNICATION NODE, AND SECOND COMMUNICATION NODE

The present disclosure is a National Stage Filing of PCT International Application No. PCT/CN2021/071022 filed on Jan. 11, 2021, which claims priority to Chinese Application 202010049570.5, filed before the Chinese Patent Office on Jan. 16, 2020, and the entire contents of which are herein incorporated by reference.

TECHNICAL FIELD

The present disclosure relates to the field of communications, and in particular, to a data transmission method and apparatus, a first communication node, and a second communication node.

BACKGROUND

A terminal supporting grant-free transmission can send data autonomously without sending a scheduling request and waiting for dynamic scheduling. Therefore, grant-free transmission can reduce signaling overhead and shorten transmission delay, and can also reduce power consumption of the terminal. Grant-free transmission scheme can be combined with non-orthogonal transmission to increase the number of access users.

With regard to grant-free transmission, when channels of two or more users are correlated, a receiver may obtain the data of the same user by detecting these users, which will lead to the problem of inaccuracy when the receiver performs interference cancellation, thereby affecting the detection of other users.

SUMMARY

Embodiments of the present disclosure provide a data transmission method and apparatus, a first communication node, and a second communication node.

In a first aspect, the embodiments of the present disclosure provide a data transmission method, applied to a first communication node, and including:

acquiring data, wherein the data includes information of N pilots; and sending the data and the N pilots;

wherein N is an integer greater than or equal to 1.

In a second aspect, the embodiments of the present disclosure provide a data transmission method, applied to a second communication node, and including:

detecting received symbols to acquire data; and acquiring information of N pilots from the data;

wherein N is an integer greater than or equal to 1.

In a third aspect, the embodiments of the present disclosure provide a data transmission apparatus, configured on a first communication node, and including:

an acquisition module, configured to acquire data, wherein the data includes information of N pilots;

a sending module, configured to send the data and the N pilots;

wherein N is an integer greater than or equal to 1.

In a fourth aspect, the embodiments of the present disclosure provide a data transmission apparatus, configured on a second communication node, and including:

a detection module, configured to detect received symbols to acquire data; and

an acquisition module, configured to acquire information of N pilots from the data;

wherein N is an integer greater than or equal to 1.

In a fifth aspect, the embodiments of the present disclosure provide a first communication node, including:

one or more processors; and a storage device for storing one or more programs, wherein when the one or more programs are executed by the one or more processors, the one or more processors implement the method according to the first aspect of the embodiments of the present disclosure.

In a sixth aspect, the embodiments of the present disclosure provide a second communication node, including:

one or more processors; and a storage device for storing one or more programs, wherein when the one or more programs are executed by the one or more processors, the one or more processors implement the method according to the second aspect of the embodiments of the present disclosure.

In a seventh aspect, the embodiments of the present disclosure provide a storage medium, wherein the storage medium stores a computer program, and when executed by a processor, the computer program implements any of the methods in the embodiments of the present disclosure.

With regard to the above embodiments and other aspects of the present disclosure, as well as implementations thereof, a further illustration will be provided in the Brief Description of the Drawings, the Detailed Description and the Claims.

BRIEF DESCRIPTION OF THE DRAWINGS

FIG. 1 is a schematic flowchart of a data transmission method provided by an embodiment of the present disclosure;

FIG. 1*a* is a schematic diagram of the structure of a transmission frame provided by an embodiment of the present disclosure;

FIG. 1*b* is a schematic diagram of the structure of specific content of data provided by an embodiment of the present disclosure;

FIG. 1*c* is a schematic diagram of the structure of a transmission frame provided by a related art;

DETAILED DESCRIPTION

Figures 1D, 1E, 1F, 1G:
FIG. 1*d* is a schematic diagram of the structure of another transmission frame provided by an embodiment of the present disclosure.
FIG. 1*e* is another schematic diagram of the structure of the specific content of the data provided by an embodiment of the present disclosure.
FIG. 1*f* is another schematic diagram of the structure of the specific content of the data provided by an embodiment of the present disclosure.
FIG. 1*g* is another schematic diagram of the structure of the specific content of the data provided by an embodiment of the present disclosure.

In order to make the objectives, technical schemes and advantages of the present disclosure clearer, the embodiments of the present disclosure will be described in detail below with reference to the drawings. It should be noted that, the embodiments in the present disclosure and the features in the embodiments can be arbitrarily combined with each other if there is no conflict.

Operations shown in the flowcharts of the drawings may be executed in a computer system, such as a group of computer-executable instructions. Moreover, although a logical sequence is shown in the flowcharts, in some cases, the operations shown or described may be executed in a sequence different from that herein.

In an exemplary embodiment, FIG. 1 is a schematic flowchart of a data transmission method provided by an embodiment of the present disclosure, and the method is applicable to a situation of improving the accuracy of interference cancellation when channels of two or more users are correlated. The method may be executed by a data transmission apparatus, the data transmission apparatus is configured on a first communication node, the apparatus may be implemented by software and/or hardware, and the first communication node may be user equipment of any type.

Grant-free transmission includes two types, that is, pre-configured grant-free transmission and contention-based grant-free transmission.

With regard to the pre-configured grant-free transmission, a base station may pre-configure or semi-statically configure time-frequency resource and pilot for each terminal. The pilot includes reference signal, preamble, and the like. When a plurality of users share the same time-frequency resource, a receiver performs user identification and detection according to the pilot. In combination with interference cancellation, the receiver eliminates the data of correctly detected users from the received multi-user superimposed data, thereby improving the detection performance of other users. The pre-configured grant-free transmission is more suitable for periodic services.

With regard to the contention-based grant-free transmission, when service arrives, the terminal may randomly select the time-frequency resource, the pilot and the like for contention-based access and transmission. The base station does not know which users are accessing, nor does the base station know the pilots used by these users, therefore the receiver needs to implement multi-user identification and detection by means of a more complex or advanced blind detection algorithm. In combination with interference cancellation, the receiver eliminates the pilots and the data of the correctly detected users from the received multi-user superimposed pilots and data respectively, thereby improving the detection performance of other users. The contention-based grant-free transmission is more suitable for random burst services, and has better transmission efficiency and lower delay.

With regard to the pre-configured grant-free transmission, when the channels of two or more users are correlated, the receiver may obtain the data of the same user by detecting these users. For example, in a case where the channels of user a and user b are correlated, when detecting the user a, the receiver may obtain the data of the user b, and also obtains the data of the user b when detecting the user b, so that the receiver misjudges that the user a is also correctly detected. In addition, the receiver eliminates the data of the user b and the data of the misjudged user a, that is, the data of the user b is eliminated twice, resulting in an interference cancellation error, thus affecting the detection of other users.

With regard to the contention-based grant-free transmission, when the channels of two or more users are correlated, the receiver may obtain the data of the same user by detecting these users. For example, in a case where the channels of user a and user b are correlated, the user a sends a pilot sequence z1, the user b sends a pilot sequence z2, then the receiver will identify two pilot sequences z1 and z2 through multi-user identification and detection, the receiver uses z1 and z2 to perform channel estimation respectively, and detects the received data symbols, so the receiver may obtain the data of the user b twice due to channel correlation. In such a case, the receiver eliminates the data and the pilot of the user b. The receiver needs to determine whether the pilot used by the user b is z1 or z2, in a case where one of z1 and z2 is eliminated, it may cause the interference cancellation error of the pilot of the user b, and the interference cancellation of data of the user b is inaccurate, thus affecting the detection of other users.

With regard to the pre-configured grant-free transmission, it is possible to avoid the problems of misjudging detection results and interference cancellation error of the receiver caused by channel correlation between the users by means of scrambling. After acquiring service data to be sent, the user performs channel coding, and then performs bit-level scrambling. Correspondingly, a base station receiver performs descrambling before decoding. Assuming that when scrambling is not performed, due to channel correlation, the base station receiver obtains the data of the user b when decoding the user a, resulting in the misjudging detection result. In a case where the user a and the user b use different scrambling codes for scrambling, the receiver performs descrambling by using the scrambling code of the user a before decoding the user a, such that a decoding error occurs, Cyclic Redundancy Check (CRC) is not passed, the detection of user a fails and data of the user b is not obtained when decoding the user a. In this way, it is possible to avoid the problem of the misjudging detection result of the receiver due to channel correlation of the users. However, the scrambling operation wastes this decoding opportunity. In addition, with regard to the contention-based grant-free transmission, the base station receiver does not know the scrambling code used by the user and thus cannot perform descrambling before decoding, and therefore the scrambling is not applicable to the contention-based grant-free transmission.

It is possible to reduce the channel correlation between the users by using spreading sequences, and alleviate the problem of inaccurate interference cancellation of the receiver caused by the channel correlation to a certain extent. The user performs channel coding and modulation after acquiring the service data to be sent, and then uses the spreading sequence for spreading. Correspondingly, the receiver uses the same spreading sequence for despreading. The spreading sequence can reduce the channel correlation between the users, and alleviate the problem of inaccurate interference cancellation of the receiver caused by the channel correlation between the users. In an exemplary implementation, a mapping relationship between the pilot sequence and the spreading sequence may be defined, for example, one pilot sequence corresponds to one spreading sequence, or a plurality of pilot sequences correspond to one spreading sequence. In a case where the channels of two users are correlated, and the two users select the same spreading sequence, the problem caused by the channel correlation cannot be solved by spreading.

In order to solve the above technical problems, the embodiments of the present disclosure provide a data transmission method. As shown in FIG. 1, the data transmission method provided by an embodiment of the present disclosure includes S110 and S120.

At S110, data is acquired, wherein the data includes information of N pilots.

During data transmission, in the present operation, the data is acquired at first, and the data carries the information of the N pilots. The data may also include other information such as service data. The service data may be independent of the information of the N pilots, and the information of the N pilots may also be indicated by a part of data in the service data. The information of the pilots includes, but is not limited to, pilot identification information, the number of the pilots, and energy information of at least one pilot.

The pilot identification information may be used for identifying the pilot. The number of the pilots can indicate the number of the pilots sent by the user, for example, the number of the pilots is N. The energy information of the pilot may be energy allocation information, such as an energy level, of the pilot.

At S120, the data and the N pilots are sent.

Herein, N is an integer greater than or equal to 1. After the data is acquired, the data and the N pilots are sent in the present operation.

The data transmission method provided by the embodiment of the present disclosure is applied to a first communication node, and includes: acquiring data, wherein the data includes information of N pilots; and sending the data and the N pilots, wherein N is an integer greater than or equal to 1. By using this method, when the first communication nodes with channel correlation perform grant-free transmission, the accuracy of interference cancellation for a second communication node is improved.

On the basis of the above-mentioned embodiment, a modified embodiment of the above-mentioned embodiment is proposed. It should be noted here that, in order to simplify the description, only the difference from the above-mentioned embodiment is described in the modified embodiment.

In an embodiment, the information of the N pilots includes pilot identification information of the N pilots.

The pilot identification information is used for identifying the pilot.

In an embodiment, the information of the N pilots includes one or more of:

the number of the pilots; and energy information of at least one pilot among the N pilots.

In an embodiment, the method further includes: acquiring the number of antennas.

In an exemplary implementation, the first communication node receives information about the number of antennas;

and determines the number of antennas based on the information about the number of antennas.

The information about the number of antennas may be information for representing the number of antennas, and the specific content of the information about the number of antennas is not limited herein. For example, the information about the number of antennas may be identification information that is in one-to-one correspondence with the number of antennas.

In an embodiment, in a case where the number of antennas is less than or equal to a specified value, it is determined that the data includes the information of the N pilots.

In a case where the first communication node is a pre-configured grant-free transmission node and the number of antennas is less than or equal to the specified value, the data includes the information of the pilots. In a case where the first communication node is a contention-based grant-free transmission node, the number of the pilots N is 1, and the number of antennas is less than or equal to the specified value, the data includes the information of the pilot. That is, in a pre-configured grant-free scenario, in a case where the number of antennas is less than or equal to the specified value, the data includes the information of the pilots. In a such contention-based grant-free scenario, in a case where the number of the pilots N is 1, in a case where the number of antennas is less than or equal to the specified value, the data includes the information of the pilot.

In an embodiment, the method further includes: determining the number of the pilots according to the number of antennas. In an embodiment, the data further includes service data.

The service data and the information of the N pilots may be carried on different locations of the data, that is, the service data is independent of the information of the pilots.

In an embodiment, a part of data in the service data indicates the information of the N pilots.

The part of data is not limited here, and the location of the part of data in the service data is not limited.

An exemplary description of the present disclosure will be given below.

Example 1

With regard to the pre-configured grant-free scheme, the base station pre-configures time-frequency resource, pilot and the like for each user. Therefore, after acquiring service data to be sent, the user may carry the information of the pre-configured pilot, so as to generate data to be sent, wherein the information of the pilot includes pilot identification information. Then, channel coding and modulation are performed, and the data to be sent is mapped onto the time-frequency resource together with pre-configured pilot.

FIG. 1a is a schematic diagram of the structure of a transmission frame provided by an embodiment of the present disclosure. Referring to FIG. 1a, the pilot may be located on one or more symbols at a headmost location of the transmission frame, or the pilot may also be located on other symbols of the transmission frame. The data may include the information of the pilot and the service data.

FIG. 1b is a schematic diagram of the structure of specific content of data provided by an embodiment of the present disclosure. Referring to FIG. 1b, the pilot identification information is represented by the pilot index. The pilot index is independent of the service data, and may be placed behind the service data, or may be placed in front of the service data.

It is assumed that the pilots pre-configured by the base station for the user a and the user b are z1 and z2 respectively. The receiver performs pilot identification and identifies z1 and z2, and then the receiver knows that the user a and the user b are sending data. The receiver uses z1 to perform channel estimation so as to detect the user a, and uses z2 to perform channel estimation so as to detect the user b. When the receiver uses z1 to perform channel estimation so as to detect the user a, in a case where CRC is passed, the receiver may determine the sent pilot according to the pilot index carried in the decoded data, and then performs comparison with z1. The comparison result includes the following two situations.

(1) The pilot index included in the data is the same as z1, then the data of the user a is successfully detected.

(2) Assuming that the channels of the user a and the user b are correlated, when detecting the user a, the receiver obtains the data of the user b after decoding, and the receiver finds that the pilot index included in the data is z2, which is different from z1 used for detection, then the receiver considers that the user a is not correctly detected, but the user b is correctly detected. In such a case, the receiver no longer detects the user b, performs interference cancellation on the user b, and detects the user a again.

Therefore, since the data to be sent by the user includes the information of the pilot, it is possible to avoid the problems of misjudging detection result and interference cancellation error of the receiver caused by the channel correlation between the users.

In an example, taking the pilot index as an example, the pilot identification information may be binary information of several bits, and is used for indicating the pilot sent by the user. Assuming that the size of a pilot set (also referred to as a pilot pool) is 16 (pilot sequence indexes are 0-15), the pilot index may indicate a pre-configured pilot index by using information of 4 bits (0000-1111). Assuming that the base station pre-configures the 11th pilot sequence for a certain user, then the user only needs to carry 4-bit binary information "1010" in the data to be sent as the pilot index, so as to indicate the pilot used by the user. After detecting the user correctly, the base station can know the pilot sent by the user according to the 4-bit pilot index, and compare the pilot with the pilot that is used for detecting the user. In a case where the pilot is the same as the pilot that is used for detecting the user, it is determined that the user is correctly detected. In a case where the pilot is different from the pilot that is used for detecting the user, the receiver can know the user which has been decoded correctly according to the information of the pilot included in the data. Assuming that the size of the pilot set is N, then the pilot index is binary information of $m=\lceil \log_2 N \rceil$ bits, and is used for indicating the pilot sent by the user, wherein $\lceil \ \rceil$ represents rounding up to an integer.

The present embodiment can simplify the process of a transmitter. After acquiring the data to be sent, the user performs channel coding and modulation, and maps the data onto a transmission resource together with the pilot without adding scrambling or spreading and other operations in the transmitter.

The present embodiment can avoid the problems of misjudging detection result and interference cancellation error of the receiver caused by the channel correlation between the users, and improve the detection performance of other users, such that the performance of grant-free transmission can be improved.

Example 2

The base station usually utilizes a multi-antenna receiving technology, which can make full use of the spatial capability on one hand, and can reduce the channel correlation between the users on the other hand. The greater the number of receiving antennas, the lower the channel correlation between the users. With regard to the pre-configured grant-free scheme, the base station not only pre-configures the time-frequency resource and the pilot for the user, but also notifies the user of the number of receiving antennas used by the base station, and the user decides whether to include the information of the pilot in the data according to the number of receiving antennas of the base station.

In an exemplary implementation, the user determines whether the data to be sent includes the information of the pilot according to the number of receiving antennas notified by the base station. In a case where the number of receiving antennas notified by the base station is less than or equal to a specified value, such as 8 antennas, that is, the channel correlation between the users is high, then the data to be sent by the users need to include the information of the pilot. In such a case, the content contained in the data to be sent is shown in the FIG. 1b. In a case where the number of receiving antennas notified by the base station is greater than the specified value, such as 8 antennas, that is, the channel correlation between the users is low, then the data to be sent by the users do not need to include the information of the pilot, but only include service data.

Example 3

With regard to the contention-based grant-free scheme, when services arrive, users may autonomously select time-frequency resources and pilot sequences for contention-based access and transmission. However, the base station does not know which users are accessing, nor does the base station know the pilot sequences used by these users, so the base station needs to perform blind multi-user identification and detection. Therefore, the data sent by the user needs to carry user identification information. Once a user is correctly detected, the base station can know the identity information of the user according to the user identification information. FIG. 1c is a schematic diagram of the structure of a transmission frame provided by a related art. Referring to FIG. 1c, the data in the transmission frame includes service data and user identification information.

In order to improve the detection performance of other users, the receiver can eliminate the pilot and data of the correctly detected user from received multi-user superimposed pilot and data, respectively. The data to be sent by the user shown in FIG. 1c does not carry the information of the pilot that is randomly selected and sent by the user. In this case, the receiver can regard the pilot used to detect the user as the pilot sent by the user, and eliminates the pilot.

However, in the presence of channel correlation of the users, interference cancellation may be inaccurate. For example, the user a and the user b send data on the same time-frequency resource, and the respectively used pilots are z1 and z2, the base station identifies z1 and z2 in pilot identification process, but the base station does not know which users use z1 and z2, so the base station respectively uses z1 and z2 for channel estimation, and then detects the received data. In a case where the channels of the user a and the user b are correlated, the data of the user b is detected by using z1, and the data of the user b is also detected by using z2. In such a case, the base station knows that the user b has been detected twice, thus eliminates the pilot used by the user b and the data of the user b once, and then detects other users. However, the base station does not know whether the pilot of the user b is z1 or z2, and if z1 is eliminated, it will result in a pilot elimination error and inaccurate data elimination.

In order to solve the problem of interference cancellation caused by the channel correlation of the users, the data to be sent by the user should also include the information of the pilot, and the information of the pilot includes pilot identification information. FIG. 1d is a schematic diagram of the structure of another transmission frame provided by an embodiment of the present disclosure. Referring to FIG. 1d, the data of the transmission frame includes service data, user identification information and the information of the pilot. Once detecting a user correctly, the base station receiver can determine the identity of the user and the information of the pilot used by the user.

FIG. 1e is another schematic diagram of the structure of the specific content of the data provided by an embodiment of the present disclosure. Referring to FIG. 1e, the pilot identification information is represented by the pilot index. The user randomly selects a pilot sequence from a pilot set, and indicates the selected pilot sequence by using the pilot index in FIG. 1e. The user combines service data to be sent, the pilot index and the user identification information to form data to be sent. Assuming that the size of the pilot set is N, then a pilot index may be a binary number of $m=\lceil \log_2 N \rceil$ bits, which is used for indicating the pilot randomly selected by the user, wherein $\lceil\ \rceil$ represents rounding up to an integer.

FIG. if is another schematic diagram of the structure of the specific content of the data provided by an embodiment of the present disclosure. As shown in FIG. 1f, the user indicates the pilot sequence selected from a pilot set according to a part of data in the service data to be sent, that is, the pilot index. Assuming that the size of the pilot set is 16 (the pilot indexes are 0-15), then the user uses the last 4 bits of data in the acquired service data to be sent as the pilot index, and selects the pilot sequence from the pilot set according to the 4 bits data. Assuming that the last 4 bits data in the service data to be sent by the user are "1010", then the user selects the 11th pilot sequence in the pilot set instead of randomly selecting a pilot sequence from the pilot set. The user may also select the pilot sequence according to the first 4 bits data in the service data to be sent, or select 4 bits data starting from the Kth bit of the service data, so as to select the pilot sequence, wherein $0 \le K \le L-4$, and L represents the number of bits in the service data to be sent by the user.

The base station usually utilizes the multi-antenna receiving technology, which can make full use of the spatial capability on one hand, and can reduce the channel correlation between the users on the other hand, and the greater the number of receiving antennas, the lower the channel correlation between the users. In an example, the user acquires information about the number of receiving antennas of the base station. In a case where the number of receiving antennas of the base station is less than or equal to a specified value, such as 8 antennas, the channel correlation between the users is high, the data to be sent by the user also needs to include the information of the pilot, as shown in FIG. 1e or FIG. 1f. In a case where the number of receiving antennas of the base station is greater than the specified value, such as 8 antennas, the channel correlation between the users is low, the data to be sent by the user may not include the information of the pilot. In such a case, the pilot that is used for detecting a user is deemed as the pilot sent by the user. In the present example, the receiver adopts multi-antenna reception to reduce the channel correlation between the users. In the present example, the user needs to acquire the information about the number of receiving antennas of the base station, that is, the information about the number of antennas. The means of acquiring the information about the number of antennas in the pre-configured grant-free scheme and the contention-based grant-free scheme may be different, and those having ordinary skill in the art can make determination according to actual situations.

In an exemplary implementation, the information of the pilot may also include energy information of the pilot. For example, in a case where the user uses power boost to send the pilot, the information of the pilot may carry the energy information of the pilot. The receiver may acquire the energy information of the pilot after correctly detecting the user.

Example 4

In Example 3, a contention-based grant-free user sends one pilot. In the present example, the first communication node may also send a plurality of pilots on the same pilot resource. Assuming that the user sends two pilots, FIG. 1g is another schematic diagram of the structure of the specific content of the data provided by an embodiment of the present disclosure, referring to FIG. 1g, the user sends two pilots, and the user respectively carries the pilot identification information of the two pilots in the data to be sent, that is, an index of pilot 1 and an index of pilot 2.

Figures 1H, 1I, 1J:
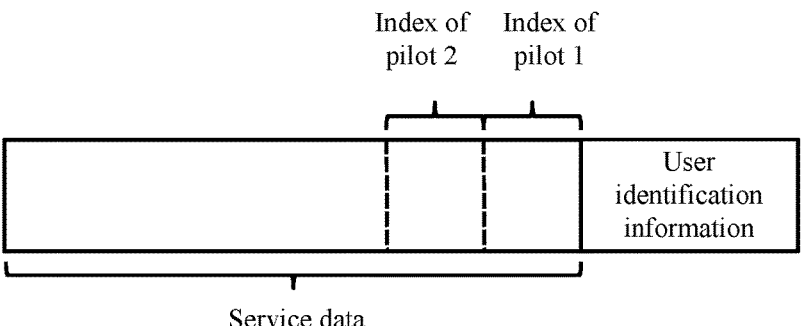
FIG. 1*h* is another schematic diagram of the structure of the specific content of the data provided by an embodiment of the present disclosure.
FIG. 1*i* is another schematic diagram of the structure of the specific content of the data provided by an embodiment of the present disclosure.
FIG. 1*j* is another schematic diagram of the structure of the specific content of the data provided by an embodiment of the present disclosure.

FIG. 1h is another schematic diagram of the structure of the specific content of the data provided by an embodiment of the present disclosure. Referring to FIG. 1h, the user selects the pilot sequences from the pilot set according to a part of data in the service data to be sent, that is, the index of pilot 1 and the index of pilot 2. The index of pilot 1 and the index of pilot 2 are pilot identification information in the information of the pilot.

With regard to the schematic diagram of the structure of the transmission frame shown in FIG. 1d, it is taken as an example that the user sends two pilot sequences, the two pilot sequences may be mapped to half of pilot resources respectively, that is, the pilot resources mapped by the two pilot sequences do not overlap, for example, the two pilot sequences are separated in the time domain (time division) or in the frequency domain (frequency division); or the two pilot sequences may share all pilot resources, that is, pilot sequences are code division.

In an exemplary implementation, the information of the pilot may also include the energy information of the pilot, and the energy information of the pilot includes energy allocation information of a plurality of pilot, etc.

Example 5

The contention-based grant-free user acquires the number of receiving antennas of the base station receiver, and according to the number of antennas, the user may select to send one pilot or a plurality of pilots. Therefore, the information of the pilot also carries the number of the pilots.

It is assumed that the user sending two pilots representing that the user sends a plurality of pilots, and the two pilots represent two different pilots. In an example, in a case where the base station uses two receive antennas, the channel correlation between the users is high, and all users send two pilots; and in a case where the base station uses four receive antennas, the channel correlation between the users is reduced, the majority of users send two pilots, the remaining users send one pilot, and the one pilot may be one pilot or two identical pilots. The majority refers to, for example, 80% of users send two pilots, and the remaining 20% of users send one pilot; and equivalently, from a single active user, the user sends two pilots at a probability of 80%, and sends one pilot at a probability of 20%. The user may generate a random number of 0-1, in a case where the random number is less than 0.2, the user sends one pilot, and in a case where the random number is greater than 0.2, the user sends two pilots. Or, according to the number of receiving antennas of the base station, the proportion of users who send one or two pilots obeys a distribution; or the probability that the user decides to send one or two pilots according to the number of receiving antennas of the base station obeys a distribution.

FIG. 1*i* is another schematic diagram of the structure of the specific content of the data provided by an embodiment of the present disclosure. The user selects to send one pilot according to the number of receiving antennas of the base station. In FIG. 1*i*, the number of the pilot is indicated to be 1, and the pilot index is the index of one pilot. The pilot index may also be indicated by a part of data in the service data.

FIG. 1*j* is another schematic diagram of the structure of the specific content of the data provided by an embodiment of the present disclosure. The user selects and sends two pilots according to the number of receiving antennas of the base station. In such a case, the specific content of the data to be sent is shown in FIG. 1*j*. The number of the pilots is indicated to be 2, and the pilot identification information includes the index of pilot 1 and the index of pilot 2. The indexes of the plurality of pilots in FIG. 1*h* may also be indicated by a part of data in the service data.

In an exemplary implementation, the information of the pilot may further include the energy information of the pilot. Under the condition that the total energy of the pilot remains unchanged, in a case where the user sends one pilot, the pilot may carry all energy of the pilot. Under the condition that the total energy of the pilot remains unchanged, in a case where the user sends a plurality of pilots: (1) the total energy is distributed evenly on the plurality of pilots, that is, the energy of the plurality of pilots is the same; and (2) the total energy is distributed unevenly on the plurality of pilots, that is, the energy of the plurality of pilots may be different. For example, the total energy is divided into a plurality of energy levels, the energy indicated by each energy level is equal or unequal, each pilot randomly selects one of the energy levels, and the energy level indexes of the plurality of pilots are different from each other, so as to ensure that the total energy remains unchanged, or is equal to or does not exceed the preset total energy. For example, the user sends two pilots, the pilots have two energy levels, and one pilot corresponds to one energy level. Therefore, the information of the pilot may carry the energy levels of two pilots respectively, or may only carry the energy level of one of the pilot, and the energy level of the other pilot is inferred, that is, the information of the pilot may include the energy information of at least one pilot.

Figure 2:
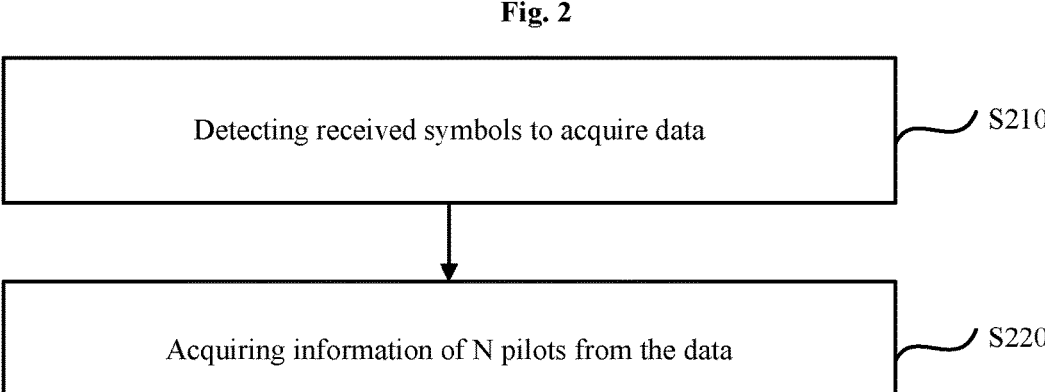
FIG. 2 is a schematic flowchart of another data transmission method provided by an embodiment of the present disclosure.

The embodiments of the present disclosure further provide a data transmission method. FIG. 2 is a schematic flowchart of another data transmission method provided by an embodiment of the present disclosure, and the method is applicable to a situation of improving the accuracy of interference cancellation when the channels of two or more users are correlated. The method may be executed by a data transmission apparatus, the apparatus may be integrated on a second communication node, and the second communication node may be a base station.

As shown in FIG. 2, the data transmission method provided by an embodiment of the present disclosure includes: S210 and S220.

At S210, received symbols are detected to acquire data.

At S220, information of N pilots is acquired from the data. Herein, N is an integer greater than or equal to 1.

An exemplary description of the present disclosure will be given below.

For details that are not described in the present embodiment, reference can be made to the above examples, and thus will not be repeated herein.

The data transmission method provided by the embodiment of the present disclosure is configured on the second communication node, and includes: detecting received symbols to acquire data; and acquiring information of N pilots from the data, wherein N is an integer greater than or equal to 1. By using this method, when first communication nodes with channel correlation perform grant-free transmission, the accuracy of the second communication node for performing interference cancellation is improved.

On the basis of the above-mentioned embodiment, a modified embodiment of the above-mentioned embodiment is proposed. It should be noted here that, in order to simplify the description, only the difference from the above-mentioned embodiment is described in the modified embodiment.

In an embodiment, the information of the N pilots includes pilot identification information of the N pilots.

In an embodiment, the information of the N pilots includes one or more of:

the number of the pilots; and energy information of at least one pilot among the N pilots.

In an embodiment, in a case where the number of antennas is less than or equal to a specified value, the information of the N pilots is acquired from the data.

During pre-configured grant-free transmission, in a case where the number of antennas is less than or equal to the specified value, the information of the N pilots can be acquired from the data. During contention-based grant-free transmission, in a case where the number of the pilots N is greater than 1, the information of the N pilots is acquired from the data. During contention-based grant-free transmission, in a case where the number of the pilots N is 1, and the number of antennas is less than or equal to the specified value, the information of the N pilots is acquired from the data.

The embodiments of the present disclosure do not limit the specified value, which may be determined by those having ordinary skill in the art based on actual situations. In a case where the specified value is 8, in a case where the number of antennas is less than the specified value, it may be considered that the channel correlation between the users is high.

In an embodiment, the data includes service data, and the information of the N pilots is acquired according to a part of data in the service data.

In an embodiment, the method further includes: performing interference cancellation according to the information of the N pilots.

In a case where the communication mode between the first communication node and the second communication node is pre-configured grant-free, the content of interference cancellation is the data. In a case where the communication mode between the first communication node and the second communication node is contention-based grant-free, the content of interference cancellation is the data and the N pilots.

In an embodiment, the method further includes: sending information about the number of antennas.

The information about the number of antennas is used by the first communication node for determining the number of antennas.

An exemplary description of the present disclosure will be given below.

Example 1 and Example 2 relate to a pre-configured grant-free scheme. With regard to the pre-configured grant-free scheme, a base station pre-configures time-frequency resources and pilots for each user.

With regard to Example 1, a receiver firstly acquires received pilot symbols from the pilot transmission resource, then detects the acquired pilot symbols, identifies the pilot sequence used by a transmitter, that is, the first communication node, performs channel estimation, and then detects the received data symbols. Once a user is correctly detected, the receiver acquires the information of the pilot of the user from user data, and compares the information of the pilot with the pilot that used to detect the user, in a case where the information of the pilot is the same as the pilot that is used to detect the user, the data of the user is correctly detected, and in a case where the information of the pilot is different from the pilot that is used to detect the user, the user corresponding to the information of the pilot included in the data is correctly detected.

With regard to Example 2, in a case where the number of receiving antennas of a base station receiver, that is, the second communication node, is greater than a specified value, such as 8 antennas, the channel correlation between the users is low, then the receiver knows that the data sent by the user does not include the information of the pilot, and after successfully detecting the user, the receiver can confirm the identity information of the user according to the pilot that is used for detecting the user. In a case where the number of receiving antennas is less than or equal to the specified value, such as 8 antennas, the channel correlation between the users is high, the receiver knows that the data sent by the user includes the information of the pilot, and then the process of the receiver is the same as that in Example 1.

Example 3, Example 4 and Example 5 relate to a contention-based grant-free scheme. The base station receiver does not know which users are accessing this time, nor does the base station know the pilots used by these users. The receiver firstly acquires the received pilot symbols from the pilot transmission resource, then performs blind detection on the acquired pilot symbols, identifies the pilot sequence used by the transmitter, performs channel estimation, and then detects the received data symbols.

With regard to Example 3, each user sends one pilot. Once a certain user is successfully detected, the user identity may be acquired according to user identification information in the user data, and the pilot used by the user may be acquired according to the information of the pilot.

In a case where the number of receiving antennas of the base station receiver, that is, the second communication node, is greater than the specified value, such as 8 antennas, the channel correlation between the users is low, then the receiver knows that the data sent by the user does not include the information of the pilot, and after successfully detecting the user, the receiver can acquire the user identity according to the user identification information in the user data, and deems that the pilot that is used for detecting the user is the pilot sent by the user. In a case where the number of receiving antennas of the base station receiver is less than or equal to the specified value, such as 8 antennas, the channel correlation between the users is high, then the receiver knows that the data sent by the user includes the information of the pilot, and after successfully detecting the user, the receiver may acquire the user identity according to the user identification information in the user data, and acquires the pilot used by the user according to the information of the pilot.

With regard to Example 4, each user sends a plurality of pilots. It is taken as an example that the user sends two pilots, the receiver detects pilot 1, identifies the pilot sequence used by the transmitter on the pilot 1, performs channel estimation, and then detects the received data symbols; and the receiver also detects pilot 2, identifies the pilot sequence used by the transmitter on the pilot 2, performs channel estimation, and then detects the received data symbols. The detection processes of the receiver on the pilot 1 and the pilot 2 may be executed in parallel or in series. Once a certain user is successfully detected, the user identity can be acquired according to the user identification information in the user data, and the two pilots sent by the user may be acquired according to the information of the pilot.

With regard to Example 5, depending on different numbers of receiving antennas, the user may send one pilot or a plurality of pilots. Once a certain user is successfully detected, the receiver can acquire the user identity according to the user identification information in the user data, acquire the number of the pilots sent by the user according to the number of the pilots, and acquires the pilot index according to pilot identification information.

Further, the receiver may acquire energy information of the pilot according to the information of the pilot carried in the data.

Further, the receiver can improve the detection performance of other users by performing interference cancellation.

Figure 3:
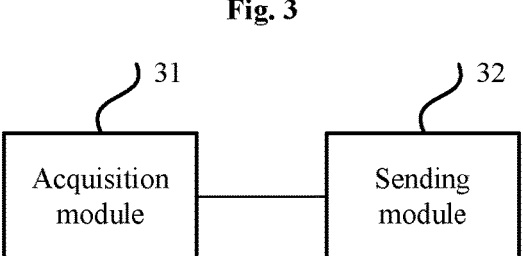
FIG. 3 is a schematic diagram of the structure of a data transmission apparatus provided by an embodiment of the present disclosure.

The embodiments of the present disclosure provide a data transmission apparatus. FIG. 3 is a schematic diagram of the structure of a data transmission apparatus provided by an embodiment of the present disclosure, and the data transmission apparatus may be configured on a first communication node. As shown in FIG. 3, the data transmission apparatus includes: an acquisition module 31, configured to acquire data, wherein the data includes information of N pilots; and a sending module 32, configured to send the data and the N pilots, wherein N is an integer greater than or equal to 1.

The data transmission apparatus provided by the present embodiment is used for implementing the data transmission method in the embodiment shown in FIG. 1. The implementation principles and technical effects of the data transmission apparatus provided by the present embodiment are similar to those of the data transmission method in the embodiment shown in FIG. 1, and thus will not be repeated herein.

On the basis of the above-mentioned embodiment, a modified embodiment of the above-mentioned embodiment is proposed. It should be noted here that, in order to simplify the description, only the difference from the above-mentioned embodiment is described in the modified embodiment.

In an embodiment, the information of the N pilots includes pilot identification information of the N pilots.

In an embodiment, the information of the N pilots includes one or more of:

the number N of the pilots; and energy information of at least one pilot among the N pilots.

In an embodiment, the apparatus further includes: an antenna number acquisition module, configured to acquire the number of antennas.

In an embodiment, in a case where the number of antennas is less than or equal to a specified value, it is determined that the data includes the information of the N pilots.

In an embodiment, the apparatus further includes: a determining module, configured to: determine the number of the pilots according to the number of antennas.

In an embodiment, the data further includes service data.

In an embodiment, a part of data in the service data indicates the information of the N pilots.

Figure 4:
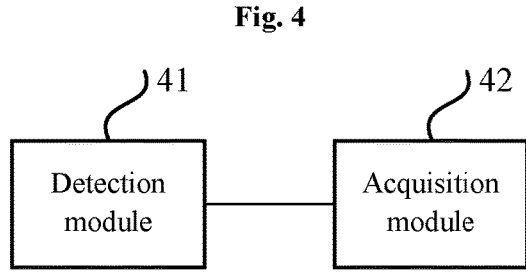
FIG. 4 is a schematic diagram of the structure of another data transmission apparatus provided by an embodiment of the present disclosure.

The embodiments of the present disclosure provide a data transmission apparatus. FIG. 4 is a schematic diagram of the structure of another data transmission apparatus provided by an embodiment of the present disclosure, and the data transmission apparatus may be configured on a second communication node. As shown in FIG. 4, the data transmission apparatus includes: a detection module 41, configured to detect received symbols to acquire data; and an acquisition module 42, configured to acquire information of N pilots from the data, wherein N is an integer greater than or equal to 1.

The data transmission apparatus provided by the present embodiment is used for implementing the data transmission method in the embodiment shown in FIG. 2. The implementation principles and technical effects of the data transmission apparatus provided by the present embodiment are similar to those of the data transmission method in the embodiment shown in FIG. 2, and thus will not be repeated herein.

On the basis of the above-mentioned embodiment, a modified embodiment of the above-mentioned embodiment is proposed. It should be noted here that, in order to simplify the description, only the difference from the above-mentioned embodiment is described in the modified embodiment.

In an embodiment, the information of the N pilots includes pilot identification information of the N pilots.

In an embodiment, the information of the N pilots includes one or more of:

the number of the pilots; and energy information of at least one pilot among the N pilots.

In an embodiment, in a case where the number of antennas is less than or equal to a specified value, the information of the N pilots is acquired from the data.

In an embodiment, the data includes service data, and the information of the N pilots is acquired according to a part of data in the service data.

In an embodiment, the apparatus further includes: performing interference cancellation according to the information of the N pilots.

In an embodiment, the apparatus further includes: a sending module, configured to send information about the number of antennas.

Figure 5:
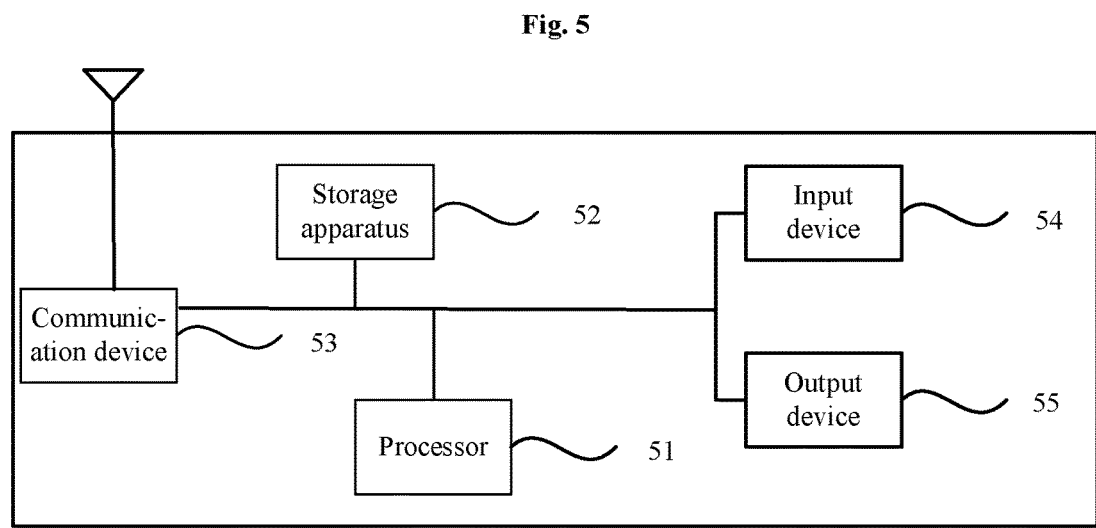
FIG. 5 is a schematic diagram of the structure of a first communication node provided by an embodiment of the present disclosure.

An embodiment of the present disclosure further provides a first communication node. FIG. 5 is a schematic diagram of the structure of a first communication node provided by an embodiment of the present disclosure, and as shown in FIG. 5, the first communication node provided by the embodiment of the present disclosure includes one or more processor 51 and storage device 52; there may be one or more processors 51 in the first communication node, and one processor 51 is taken as an example in FIG. 5; the storage device 52 is used for storing one or more programs; and the one or more programs are executed by the one or more processors 51, so that the one or more processors 51 implement the method described in FIG. 1 in the embodiment of the present disclosure.

The first communication node further includes: a communication device 53, an input device 54 and an output device 55.

The processor 51, the storage device 52, the communication device 53, the input device 54 and the output device 55 in the first communication node may be connected by means of buses or in other ways, and the a bus connection is taken as an example in FIG. 5.

The input device 54 may be used for receiving input numerical or character information, and generating a key signal input that is correlated to user settings and function control of the first communication node. The output device 55 may include a display device such as a display screen.

The communication device 53 may include a receiver and a transmitter. The communication device 53 is configured to perform information sending and receiving communication according to the control of the processor 51. The information includes, but is not limited to, data and N pilots.

As a computer-readable storage medium, the storage device 52 may be configured to store software programs, computer-executable programs and modules, such as program instructions/modules corresponding to the method described in FIG. 1 (for example, the acquisition module 31 and the sending module 32 in the data transmission apparatus). The storage device 52 may include a program storage area and a data storage area, wherein the program storage area may store application programs required by an operating system and at least one function; and the data storage area may store data created according to the use of the first communication node. In addition, the storage device 52 may include high-speed random access memory, and may also include a nonvolatile memory, such as at least one magnetic disk storage device, a flash memory device, or other nonvolatile solid-state storage devices. In some instances, the storage device 52 may further include memories that are arranged remotely relative to the processor 51, and these memories may be connected to the first communication node by a network. Instances of the network include, but are not limited to, the Internet, an intranet, a local area network, a mobile communication network, and combinations thereof.

Figure 6:
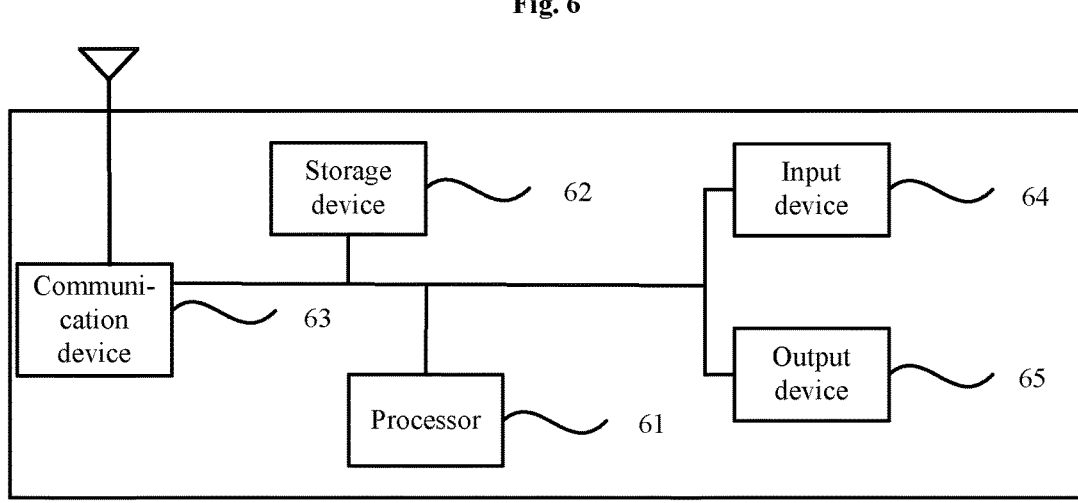
FIG. 6 is a schematic diagram of the structure of a second communication node provided by an embodiment of the present disclosure.

An embodiment of the present disclosure further provides a second communication node. FIG. 6 is a schematic diagram of the structure of a second communication node provided by an embodiment of the present disclosure, and as shown in FIG. 6, the second communication node provided by the embodiment of the present disclosure includes one or more a processor 61 and a storage device 62; there may be one or more processors 61 in the second communication node, and one processor 61 is taken as an example in FIG. 6; the storage device 62 is used for storing one or more programs; and the one or more programs are executed by the one or more processors 61, so that the one or more processors 61 implement the method described in FIG. 1 in the embodiment of the present disclosure.

The second communication node further includes: a communication device 63, an input device 64 and an output device 65.

The processor 61, the storage device 62, the communication device 63, the input device 64 and the output device 65 in the second communication node may be connected by means of buses or in other ways, and the a bus connection is taken as an example in FIG. 6.

The input device 64 may be used for receiving input numerical or character information, and generating a key signal input that is correlated to user settings and function control of the second communication node. The output device 65 may include a display device such as a display screen.

The communication device 63 may include a receiver and a transmitter. The communication device 63 is configured to perform information sending and receiving communication according to the control of the processor 61.

As a computer-readable storage medium, the storage device 62 may be configured to store software programs, computer-executable programs and modules, such as program instructions/modules corresponding to the method described in FIG. 2 (for example, the detection module 41 and the acquisition module 42 in the data transmission apparatus). The storage device 62 may include a program storage area and a data storage area, wherein the program storage area may store application programs required by an operating system and at least one function; and the data storage area may store data created according to the use of the second communication node. In addition, the storage device 62 may include high-speed random access memory, and may also include a nonvolatile memory, such as at least one magnetic disk storage device, a flash memory device, or other nonvolatile solid-state storage devices. In some instances, the storage device 62 may further include memories that are arranged remotely relative to the processor 61, and these memories may be connected to the second communication node by a network. Instances of the network include, but are not limited to, the Internet, an intranet, a local area network, a mobile communication network, and combinations thereof.

An embodiment of the present disclosure further provides a storage medium, wherein a computer program is stored in the storage medium, and when executed by a processor, the computer program implements the data transmission method described in any of the embodiments of the present disclosure, for example, the data transmission method applied to the first communication node and the data transmission method applied to the second communication node, wherein the data transmission method applied to the first communication node includes: acquiring data, wherein the data includes information of N pilots; and sending the data and the N pilots, wherein N is an integer greater than or equal to 1.

The data transmission method applied to the second communication node includes: detecting received symbols to acquire data; and acquiring information of N pilots from the data, wherein N is an integer greater than or equal to 1.

The computer storage medium in the embodiment of the present disclosure can utilize any combination of one or more computer-readable media. The computer-readable medium may be a computer-readable signal medium or a computer-readable storage medium. The computer-readable storage medium may be, for example, but is not limited to, electrical, magnetic, optical, electromagnetic, infrared, or semiconductor systems, apparatuses or devices, or a combination of any of the above systems, apparatuses or devices. More specific examples (non-exhaustive list) of the computer-readable storage medium include: an electrical connection with one or more wires, a portable computer disk, a hard disk, a random access memory (Random Access Memory, RAM), a read only memory (Read Only Memory, ROM), an erasable programmable read only memory (Erasable Programmable Read Only Memory, EPROM), a flash memory, an optical fiber, a portable compact disc read-only memory (Compact Disc Read-Only Memory, CD-ROM), an optical storage device, a magnetic storage device, or any suitable combination of the above devices. The computer-readable storage medium may be any tangible medium that contains or stores a program, and the program may be used by or combined with an instruction execution system, apparatus or device for use.

The computer-readable signal medium may include a data signal that is propagated in a baseband or propagated as part of a carrier, and computer-readable program codes are carried therein. Such a propagated data signal may take a variety of forms, including, but are not limited to, an electromagnetic signal, an optical signal, or any suitable combination of the foregoing signals. The computer-readable signal medium may also be any computer-readable medium other than the computer-readable storage medium, and the computer-readable medium may send, propagate or transmit the program that is used by or combined with the instruction execution system, apparatus or device for use.

Program codes contained in the computer-readable medium may be transmitted by using any suitable medium, including, but are not limited to: wireless, wire, optical fiber cables, radio frequency (Radio Frequency, RF) and the like, or any suitable combination of the foregoing manners.

Computer program codes for executing the operations of the present disclosure may be written in one or more programming languages or combinations thereof, the programming languages include object-oriented programming languages, such as Java, Smalltalk and C++, and also includes conventional procedural programming languages, such as "C" language or similar programming languages. The program codes may be completely executed on a user computer, partly on the user computer, as a stand-alone software package, partly on the user computer and partly on a remote computer, or completely on the remote computer or a server. In the case involving the remote computer, the remote computer may be connected to the user computer by means of any kind of network, including a local area network (Local Area Network, LAN) or a wide area network (Wide Area Network, WAN), or may be connected to an external computer (e.g., by means of the Internet provided by an internet service provider).

The above descriptions are merely exemplary embodiments of the present disclosure, and are not intended to limit the protection scope of the present disclosure.

Those having ordinary skill in the art should understand that, the term user equipment encompasses any suitable type of wireless user equipment, such as a mobile telephone, a portable data processing apparatus, a portable web browser or a vehicle-mounted mobile station.

In general, various embodiments of the present disclosure may be implemented in hardware or dedicated circuits, software, logic, or any combination thereof. For example, some aspects may be implemented in hardware, while other aspects may be implemented in firmware or software that may be executed by a controller, a microprocessor or other computing apparatuses, although the present disclosure is not limited thereto.

The embodiments of the present disclosure may be implemented by a data processor of a mobile apparatus by means of executing computer program instructions, for example, in a processor entity, or by hardware, or by a combination of software and hardware. The computer program instructions may be assembly instructions, instruction set architecture (Instruction Set Architecture, ISA) instructions, machine instructions, machine related instructions, micro-codes, firmware instructions, state setting data, or source codes or target codes that are written in any combination of one or more programming languages.

The block diagrams of any logic flow in the drawings of the present disclosure may represent program operations, or may represent interconnected logic circuits, modules and functions, or may represent a combination of program operations and logic circuits, modules and functions. Computer programs may be stored on a memory. The memory may be of any type suitable for a local technical environment and may be implemented by using any suitable data storage technology, such as, but is not limited to, a read only memory (ROM), a random access memory (RAM), an optical memory apparatus and system (a digital video disc (Digital Video Disc, DVD) or a compact disk (Compact Disk, CD), etc. The computer-readable medium may include a non-transitory storage medium. The data processor may be of any type suitable for the local technical environment, such as, but is not limited to, a general-purpose computer, a special-purpose computer, a microprocessor, a digital signal processor (Digital Signal Processing, DSP), an application-specific integrated circuit (Application Specific Integrated Circuit, ASIC), a field-programmable gate array (Field-Programmable Gate Array, FGPA) and a processor based on a multi-core processor architecture.

By way of illustrative and nonrestrictive examples, a detailed description of exemplary embodiments of the present disclosure has been provided above. However, when considered in conjunction with the drawings and claims, various modifications and adjustments to the above embodiments will be apparent to those having ordinary skill in the art without departing from the scope of the present disclosure. Accordingly, a proper scope of the present disclosure will be determined according to the claims.

What is claimed is:

1. A data transmission method, applied to a first communication node, and comprising:
    acquiring data, wherein the data comprises service data and information of N pilots, wherein the information of the N pilots comprises pilot identification information of the N pilots, and the pilot identification information is represented by a pilot index; and
    mapping the data and the N pilots onto a transmission resource to sending the data and the N pilots;
    wherein N is an integer greater than or equal to 1.

2. The method according to claim 1, wherein the information of the N pilots comprises at least one of:
    the number of the pilots; and
    energy information of at least one pilot among the N pilots.

3. The method according to claim 1, further comprising:
acquiring a number of receiving antennas used by a second communication node.

4. The method according to claim 3, further comprising:
in response to the number of the receiving antennas used by the second communication node being less than or equal to a specified value, determining that the data comprises the information of the N pilots.

5. The method according to claim 3, further comprising:
    determining the number of the pilots according to the number of the receiving antennas used by the second communication node.

6. The method according to claim 1, wherein a part of data in the service data indicates the information of the N pilots.

7. A data reception method, applied to a second communication node, and comprising:
    acquiring received symbols from a transmission resource, detecting the received symbols and identifying N pilots mapped onto the transmission resource by a first communication node;
    decoding, according to the identified N pilots, data mapped onto the transmission resource by the first communication node, wherein the data comprises service data and information of N pilots sent by the first communication node, the information of the N pilots comprises pilot identification information of the N pilots;
    acquiring the information of the N pilots from the data; and
    performing interference cancellation according to the information of the N pilots,
    wherein N is an integer greater than or equal to 1.

8. The method according to claim 7, wherein the information of the N pilots comprises at least one of:
    the number of the pilots; and
    energy information of at least one pilot among the N pilots.

9. The method according to claim 7, wherein acquiring the information of the N pilots from the data comprises: in response to a number of receiving antennas used by the second communication node being less than or equal to a specified value, acquiring the information of the N pilots from the data.

10. The method according to claim 7, wherein service data, and acquiring the information of the N pilots from the data comprises: acquiring the information of the N pilots according to a part of data in the service data.

11. The method according to claim 7, further comprising: sending information about a number of receiving antennas used by the second communication node.

12. A first communication node, comprising:
    at least one processor; and
    a storage device, configured to store at least one program, wherein when the at least one program is executed by the at least one processor, the at least one processor implements the method according to claim 1.

13. A second communication node, comprising:
    at least one processor; and
    a storage device, configured to store at least one program, wherein when the at least one program is executed by the at least one processor, the at least one processor implements the method according to claim 7.

14. A non-transitory computer-readable storage medium, wherein the non-transitory computer-readable storage medium stores a computer program, and when executed by a processor, the computer program implements the method according to claim 1.

15. A non-transitory computer-readable storage medium, wherein the non-transitory computer-readable storage medium stores a computer program, and when executed by a processor, the computer program implements the method according to claim 7.

* * * * *